US012506296B2

(12) United States Patent
Orlov et al.

(10) Patent No.: US 12,506,296 B2
(45) Date of Patent: Dec. 23, 2025

(54) ELECTRICAL CONNECTOR WITH MAGNETIC BALL AND PLANAR SPRING RETAINER

(71) Applicant: Cubios, Inc., Key West, FL (US)

(72) Inventors: Semyon Olegovich Orlov, Nizhniy Novgorod (RU); Ilya Viktorovich Osipov, Sarasota, FL (US)

(73) Assignee: Cubios, Inc., Key West, FL (US)

( * ) Notice: Subject to any disclaimer, the term of this patent is extended or adjusted under 35 U.S.C. 154(b) by 666 days.

(21) Appl. No.: 17/572,555

(22) Filed: Jan. 10, 2022

(65) Prior Publication Data

US 2022/0131314 A1 Apr. 28, 2022

Related U.S. Application Data

(63) Continuation-in-part of application No. PCT/RU2020/050148, filed on Jul. 3, 2020.

(30) Foreign Application Priority Data

Jul. 9, 2019 (RU) .......................... RU2019121376

(51) Int. Cl.

*H01R 13/62* (2006.01)
*H01R 13/24* (2006.01)
*H01R 13/639* (2006.01)

(52) U.S. Cl.

CPC ..... *H01R 13/6205* (2013.01); *H01R 13/2407* (2013.01); *H01R 13/639* (2013.01)

(58) Field of Classification Search

CPC .......................... H01R 13/00; H01R 13/2407; H01R 13/2485; H01R 13/62; H01R 13/6205; H01R 13/639; H01R 12/00; H01R 12/70; H01R 11/11; H01R 11/30

USPC ......................................................... 439/266

See application file for complete search history.

(56) References Cited

U.S. PATENT DOCUMENTS

| | | | |
|---|---|---|---|
| 2,086,424 | A | 7/1937 | Koehler |
| 3,576,936 | A | 5/1971 | Fischer |
| 3,655,201 | A | 4/1972 | Nichols |
| 4,513,970 | A | 4/1985 | Opresco et al. |
| 4,546,267 | A | 10/1985 | Urfirer |
| 5,941,714 | A | 8/1999 | Gorbet |
| 6,469,901 | B1 | 10/2002 | Costner |

(Continued)

FOREIGN PATENT DOCUMENTS

| | | |
|---|---|---|
| AU | 2017345410 | 6/2019 |
| CN | 103418146 A | 12/2013 |

(Continued)

OTHER PUBLICATIONS

[Ball Mouse] The most popular item in FPS games, it must be a ball mouse, Internet Naver end of blog post, Mar. 29, 2013.

(Continued)

*Primary Examiner* — Abdullah A Riyami
*Assistant Examiner* — Amara Anderson
(74) *Attorney, Agent, or Firm* — Cozen O'Connor

(57) ABSTRACT

An electrical connector includes a connector body, including a cavity and a contact aperture providing an opening to the cavity through a connector surface. An electrical contact is situated in the cavity, which includes a magnetic ball, and a retainer that includes a planar spiral spring portion and a ring portion.

11 Claims, 5 Drawing Sheets

(56) References Cited

U.S. PATENT DOCUMENTS

| | | | | |
|---|---|---|---|---|
| 6,919,787 | B1 * | 7/2005 | Macken | H01F 7/0252 335/302 |
| 6,974,130 | B2 | 12/2005 | Sugden | |
| 7,322,873 | B2 | 1/2008 | Rosen et al. | |
| 7,828,556 | B2 | 11/2010 | Rodrigues | |
| 7,862,415 | B1 | 1/2011 | Ghaly | |
| 7,997,970 | B2 | 8/2011 | Katz et al. | |
| 8,187,006 | B2 | 5/2012 | Rudisill et al. | |
| 8,395,465 | B2 | 3/2013 | Lauder et al. | |
| 8,873,239 | B2 | 10/2014 | McRae et al. | |
| 9,111,382 | B2 | 8/2015 | Ueno et al. | |
| 9,300,081 | B2 | 3/2016 | Rudisill et al. | |
| 9,597,607 | B2 | 3/2017 | Bdier | |
| 9,755,356 | B1 | 9/2017 | Kim et al. | |
| 9,907,195 | B2 | 2/2018 | Montazeri | |
| 10,063,009 | B2 | 8/2018 | Szeto | |
| 10,376,804 | B2 | 8/2019 | Lu | |
| 10,512,853 | B2 | 12/2019 | MacDonald et al. | |
| 2010/0197148 | A1 | 8/2010 | Rudisill et al. | |
| 2010/0308536 | A1 | 12/2010 | Stolten | |
| 2011/0084474 | A1 | 4/2011 | Paden et al. | |
| 2012/0258436 | A1 | 10/2012 | Lee | |
| 2012/0302303 | A1 | 11/2012 | Rosendo | |
| 2013/0109267 | A1 | 5/2013 | Schweikardt et al. | |
| 2013/0316549 | A1 * | 11/2013 | DiFonzo | H01R 13/6205 439/39 |
| 2014/0325413 | A1 | 10/2014 | Delfino | |
| 2014/0363987 | A1 * | 12/2014 | Hodge | H01R 13/6205 439/39 |
| 2016/0268729 | A1 | 9/2016 | Szeto | |
| 2017/0264046 | A1 | 9/2017 | Szeto | |
| 2018/0311566 | A1 | 11/2018 | Shin | |
| 2019/0044273 | A1 * | 2/2019 | Lam | H01R 31/005 |
| 2019/0358549 | A1 | 11/2019 | Osipov et al. | |
| 2020/0161037 | A1 | 5/2020 | Osipov | |

FOREIGN PATENT DOCUMENTS

| | | | |
|---|---|---|---|
| CN | 2037566509 | U | 8/2014 |
| CN | 106110651 | A | 11/2016 |
| EP | 2130569 | A2 | 12/2009 |
| FR | 2775373 | | 8/1999 |
| JP | 3017180 | | 3/2000 |
| JP | 2009512484 | A | 3/2009 |
| JP | 2009291462 | A | 12/2009 |
| JP | 2016075820 | | 5/2016 |
| KR | 20070104336 | A | 10/2007 |
| KR | 1020130023842 | A | 3/2013 |
| KR | 1020160083948 | A | 12/2016 |
| WO | 2010088695 | A1 | 8/2010 |
| WO | 2010120780 | A1 | 10/2010 |
| WO | 2012158616 | A2 | 11/2012 |
| WO | 2015070321 | A1 | 5/2015 |

OTHER PUBLICATIONS

Office Action of corresponding Chinese Application No. 202080062195.6, dated Dec. 20, 2023.

* cited by examiner

ELECTRICAL CONNECTOR WITH MAGNETIC BALL AND PLANAR SPRING RETAINER

PRIORITY

This Application is a Continuation-in-Part (CIP) of International Application No. PCT/RU2020/050148, having an International Filing Date of Jul. 3, 2020, and claiming the benefit of Russian Patent Application No. 2019121376, filed Jul. 9, 2019 (now granted as Russian Patent No. 2,720,884), the disclosures of which are incorporated by reference herein.

TECHNICAL FIELD

Aspects of the invention relate generally to electro-mechanics and, more particularly, to electrical connectors that can reliably make and break connections among devices with relatively-moving surfaces.

BACKGROUND

A wide range of electrical connectors are available for designers of electronic devices. Perhaps the most common type of electrical connector is a plug-and-socket pair. However, the plug and the mating socket are not interchangeable. Additionally, if an unintended voltage source is accidentally contacted to an exposed contact pin, damage to the circuitry coupled to that contact pin may result. Likewise, exposed contact pairs are susceptible to short-circuits if the contact pair is somehow bridged by a conductive material. Furthermore, in the case of high-voltage applications, exposed contacts are unacceptably dangerous as accidental contact could cause serious injury.

In signal-transmitting electrical connection, the contact of a person's body with electrical contacts can change the electrical characteristics of the transmission line and adversely affect the operation of the device.

DETAILED DESCRIPTION

Figure 1:
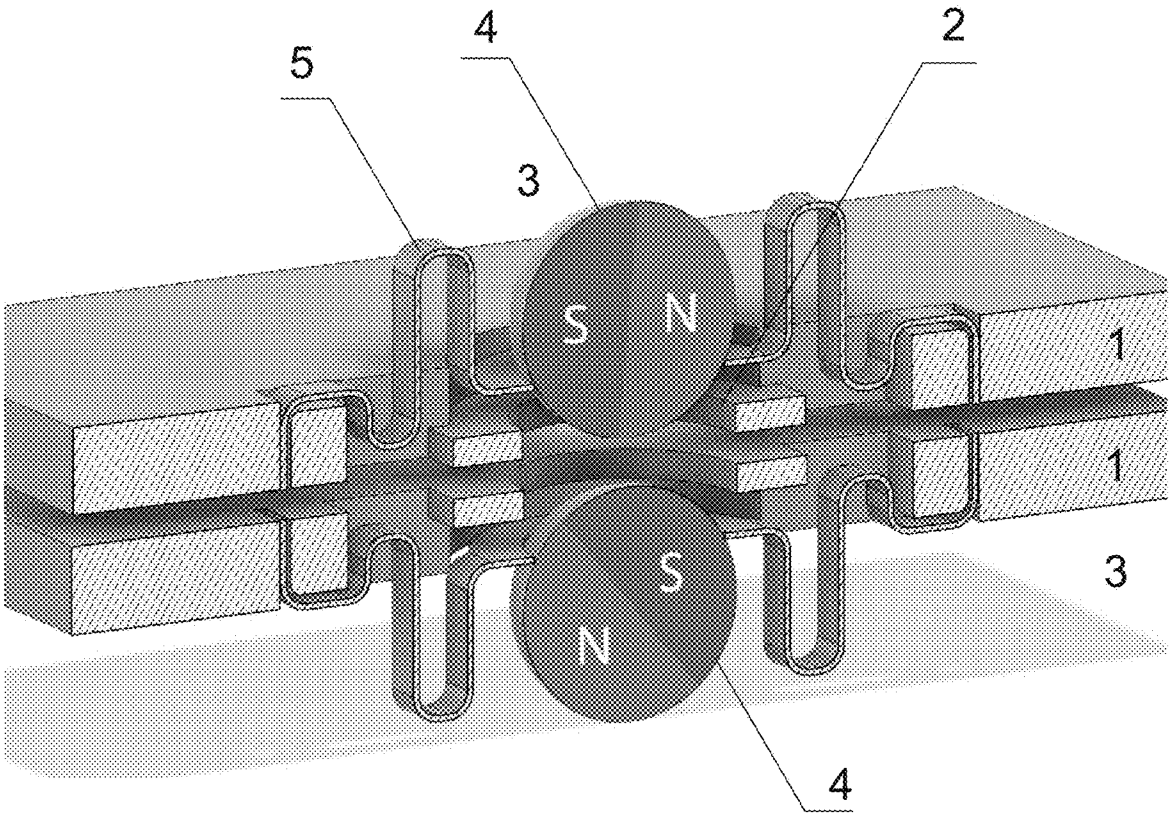
FIG. 1 is a cutaway diagram illustrating of a pair of electrical connectors that form electrical connection at the instant of the interaction start, according to an embodiment.

One aspect of the embodiments is directed to an electrical connector that includes a body with a contact aperture, in whose cavity an electrical contact is situated, which makes it possible to widen the inventory of electrical connectors and ensure reliable electrical connection between connectors in the closed condition, while each individual connector does not have electrical contacts protruding beyond the connector body. In one example, the electrical contact is made as a magnetic ball with a retainer made of an electrically conductive material. The retainer is installed in a position relative to the magnetic ball so as to press the ball away from the contact aperture by retracting the ball into the body.

In a non-engaged state, the electrical contact has no substantial protruding portion beyond the connector body.

In an engaged state, as when the electrical connector contacts a similar electrical connector, a reliable connection and a closed circuit may be formed. Notably, the retainer serves as part of the electrical circuit which is formed when the connector is engaged with a counterpart connector.

The engagement of such electrical connectors tolerates some free movement of the connectors, whether with parallel displacement or rotation. In the engaged state, magnetic balls protrude outward from their respective bodies and towards each other by a short distance (i.e. each by up to a fraction of the ball's radius) and thus the pair can cover the gap between the bodies of the electrical connectors, which may remain in a spaced relationship while the connectors are engaged.

In a related embodiment, the retainer is made as a planar spring in which a ring is formed. The internal diameter of the ring is smaller than the diameter of the corresponding magnetic ball. The ring portion facilitates a firm circumferential contact with the magnetic ball, thus facilitating a reliable electrical connection therebetween. Since the interior diameter of the ring portion is shorter than the ball diameter, the ball touches the ring portion not at one point, but along its circumference, which ensures good electrical contact and no contact chatter.

In a related embodiment, the retainer includes a planar-spiral spring portion with a pair of ring-shaped portions which are spaced apart at a distance, each ring-shaped portion having an interior diameter that is smaller than the diameter of the magnetic ball, and the distance being smaller than the diameter of the ball.

In a related embodiment, the retainer is made of a diamagnetic material. This advantageous feature ensures weak magnetic interaction between the retainer and the magnetic ball, which permits rotation of the ball while the ball is in contact with the retainer.

In another embodiment, the retainer is made of a ferromagnetic material. This advantageous feature ensures the possibility of magnetic interaction between the retainer and the magnetic ball, which tends to strengthen the intimacy of contact between the retainer and the ball for a reliable electrical connection.

In a related aspect, an electrical connection comprises a pair of electrical connectors, each of which has a body with a contact aperture, and which defines a cavity in which an electrical contact is situated. Such a connection may be practical in devices requiring a plurality of distinct electrical connections with reliable electrical contact between pairs of connectors. Also, advantageously, each individual connector may avoid any substantially protruding portion of the connector beyond the corresponding body when in the non-engaged state. In some embodiments, the electrical contact of each electrical connector is formed as a magnetic ball, and a retainer made of a conductive material. The retainer of each electrical connector may be located, with respect to the ball that it retains, in such a way as to press the ball inwardly into the cavity in the body, so as to retract the ball away from the contact aperture.

Such an arrangement makes it possible to prevent protrusion of any substantial portion of the contact beyond the connector body when the connector is in its non-engaged state. When the connector is engaged with a peer connector, reliable connection is formed and the circuit is closed. The connection of such electrical connectors tolerates some free movement of the connectors, whether with parallel displacement, or rotation. The magnetic balls protrude outward from their respective cavities towards one another by a short distance (as a fraction of each ball's radius) and can thereby compensate for any gap between the bodies of the electrical connectors.

Referring the drawings generally, the reference numerals indicate the following features:

1—body;
2—contact aperture;
3—cavity;
4—magnetic ball;
5—spring;
6—ring portion;
7—spiral.

Figure 2:
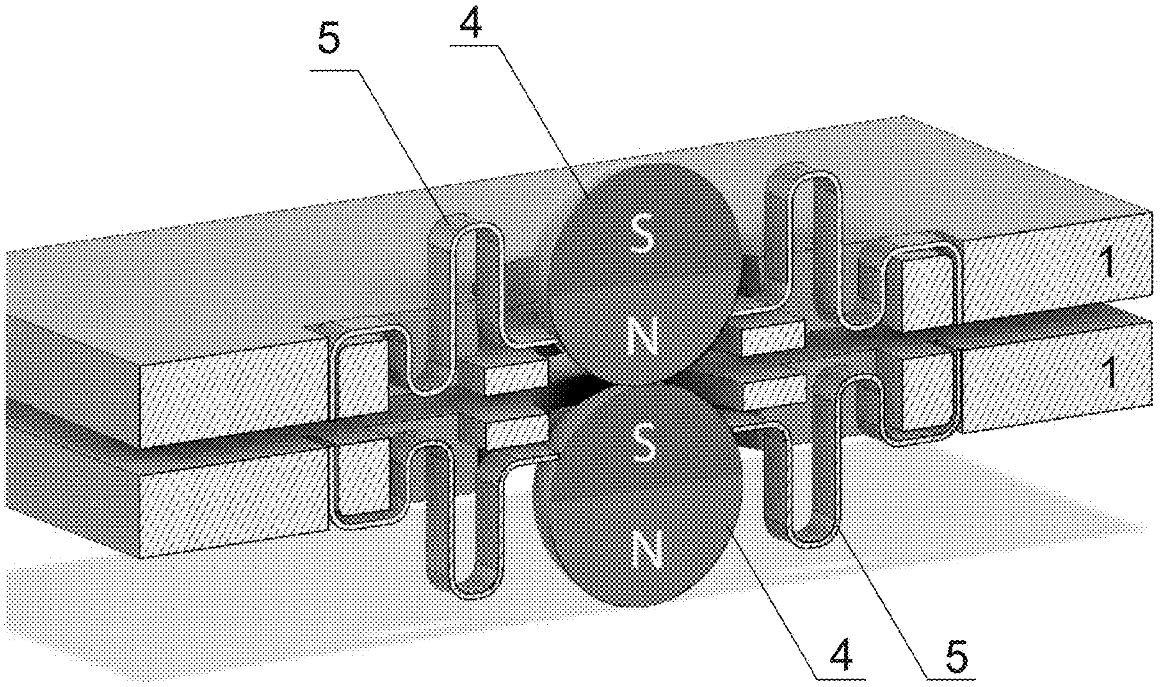
FIG. 2 is a cutaway diagram illustrating the pair of electrical connectors of FIG. 1 that form an electrical connection due to interaction of magnetic balls, according to a related embodiment.
Figure 3:
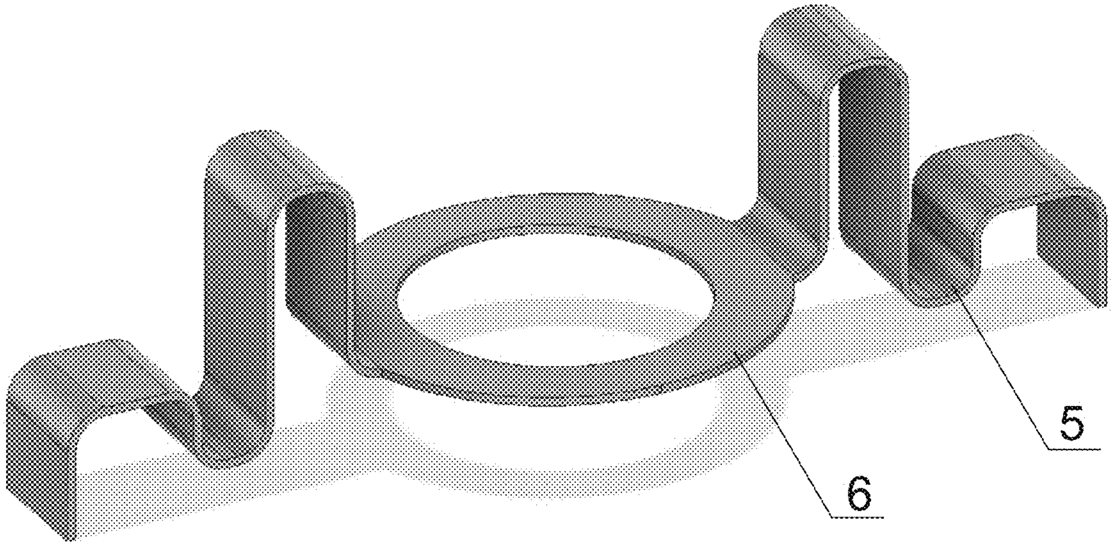
FIG. 3 is an isometric-view diagram illustrating an example of a retainer, according to an embodiment.
Figure 4:
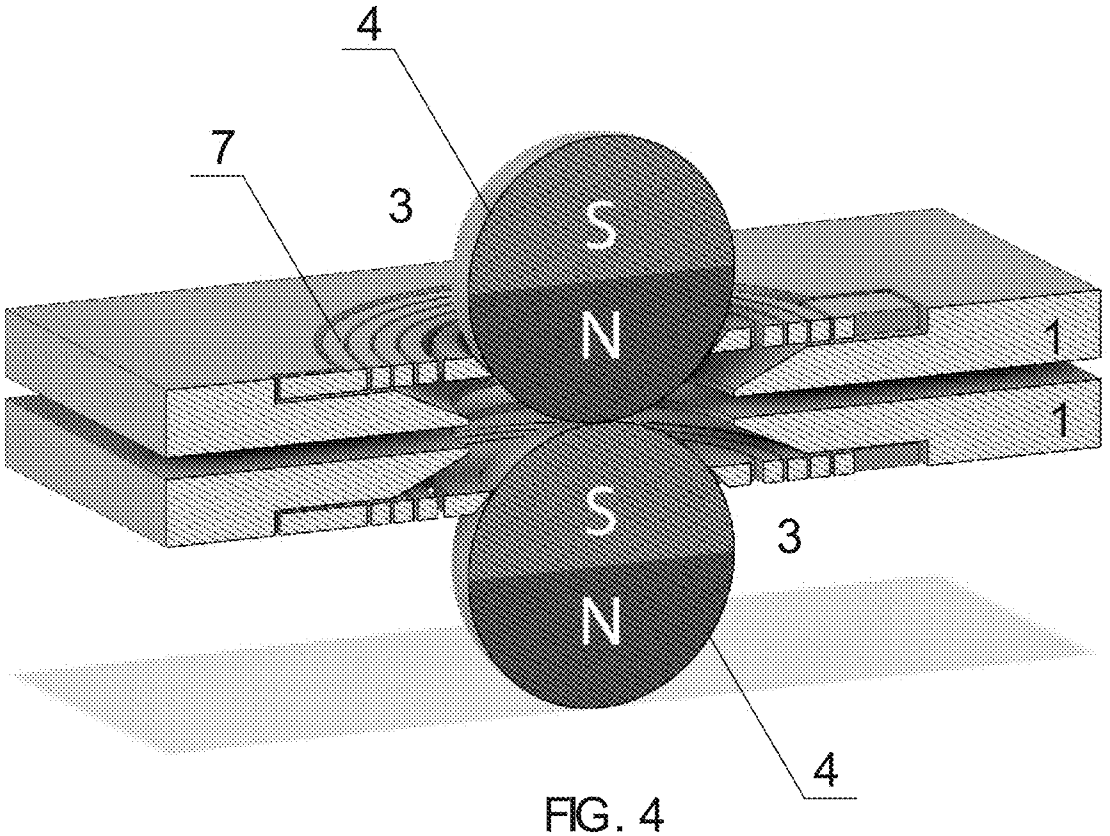
FIG. 4 is a cutaway diagram illustrating a pair of electrical connectors that form an electrical connection after the interaction of magnetic balls, and including another example of a retainer, according to a related embodiment.
Figure 5:
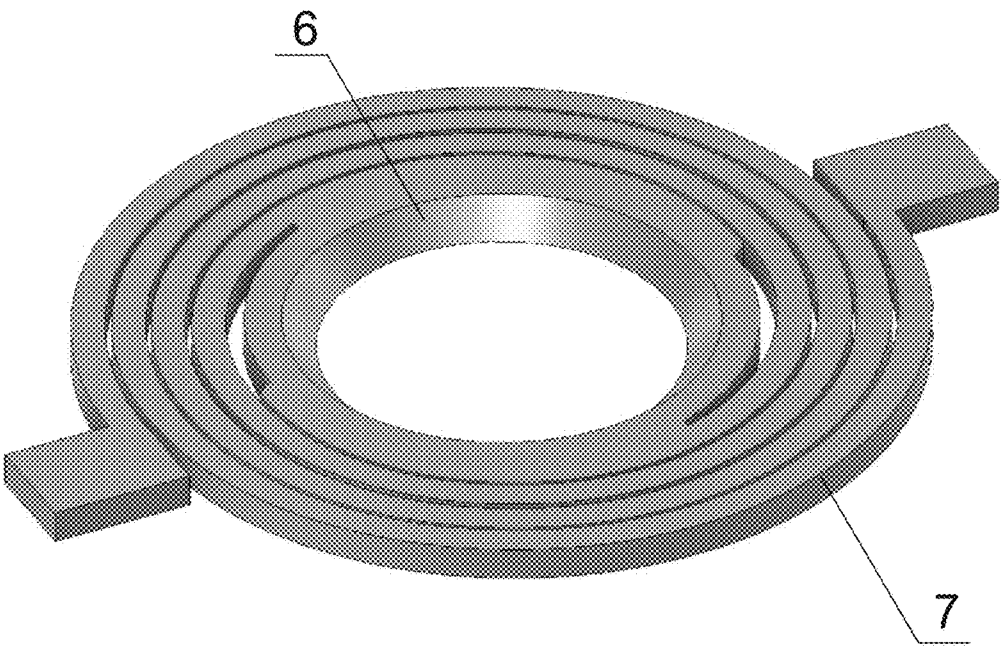
FIG. 5 is an isometric-view diagram illustrating a retainer according to the embodiment of FIG. 4, in which retainer is shaped as a planar spiral structure.
Figure 6:
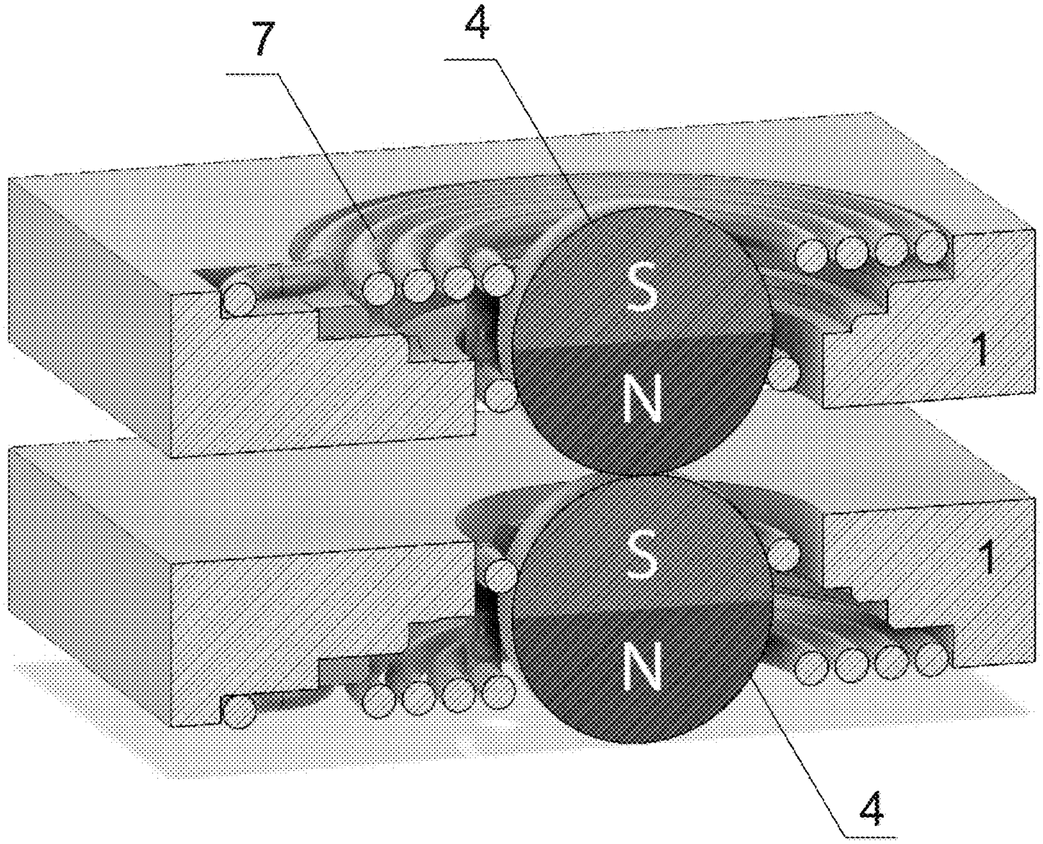
FIG. 6 is a cutaway diagram illustrating a pair of electrical connectors that are connected via interaction of magnetic balls as a related embodiment in which the retainer includes a pair of retention rings.
Figure 7:
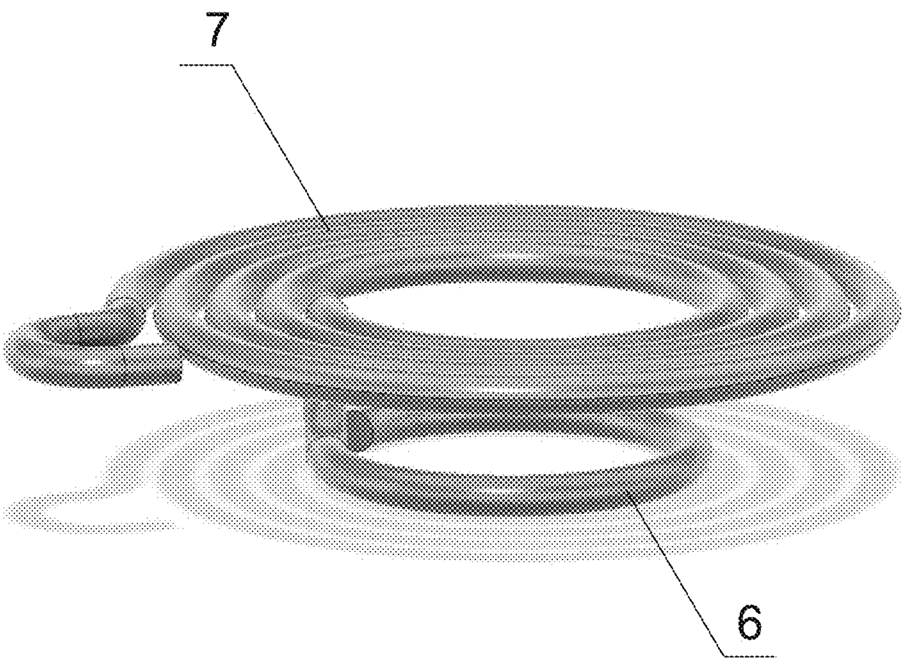
FIG. 7 is an isometric-view diagram illustrating a retainer according to the embodiment of FIG. 6, in which the retainer includes a pair of retention rings and a planar spiral portion according to an example.
Figure 8:
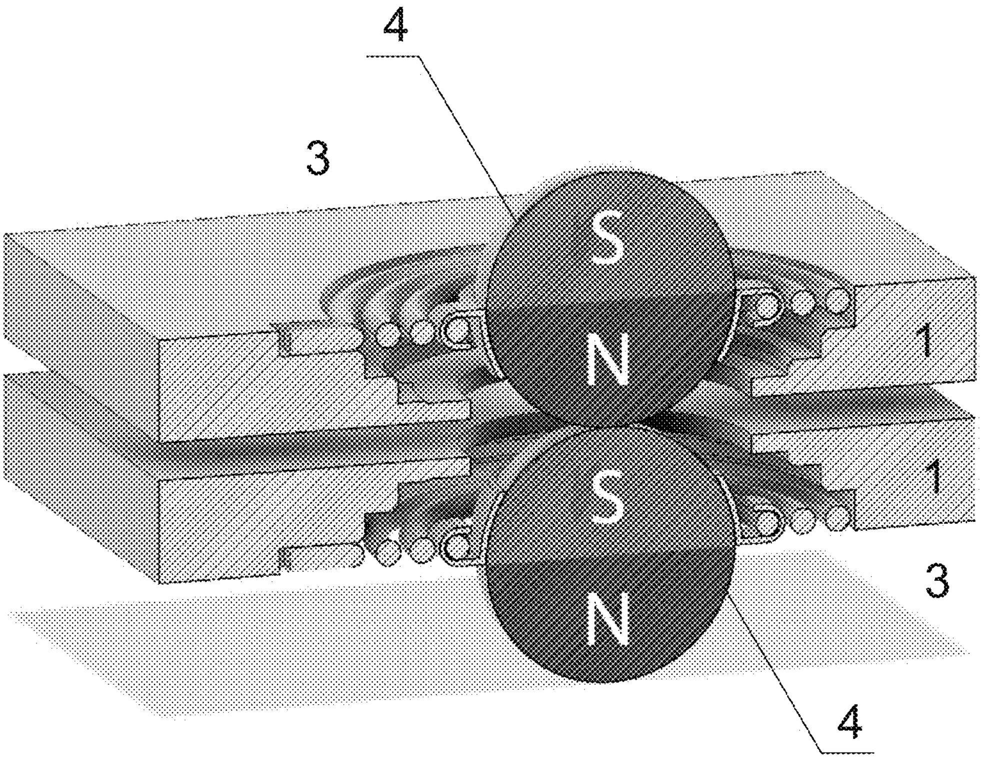
FIG. 8 is a cutaway diagram illustrating a pair of electrical connectors that form a connection via interaction of magnetic balls as a related embodiment in which the retainer includes a planar spiral portion and a collar portion.
Figure 9:
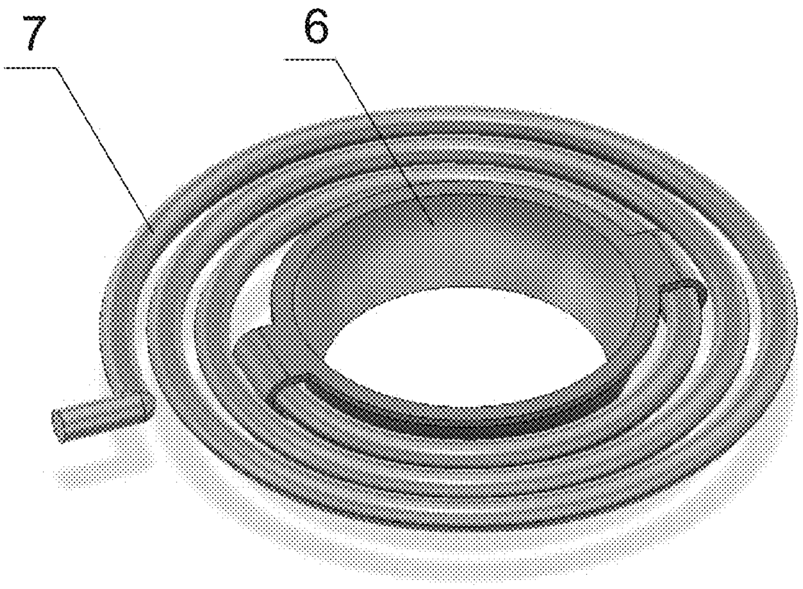
FIG. 9 is an isometric-view diagram illustrating a retainer according to the embodiment of FIG. 8, in which the retainer includes a planar spiral portion and a collar portion.

According to FIGS. 1-9, the electrical connector includes body 1 with contact aperture 2, in whose cavity 3 an electrical contact is situated. The electrical contact is made as magnetic ball 4 and a retainer made of a current-conducting material. The retainer is located, with respect to magnetic ball 4, in such a way as to press it away from contact aperture 2, such that it is retracted into body 1.

The retainer is made as a planar spring 5 that has ring portion 6 with an internal diameter shorter than the diameter of magnetic ball 4.

The retainer is made as a spring shaped as a planar spiral 7.

The planar spiral has ring portion 6 with an internal diameter that is shorter than the diameter of the magnetic ball.

The retainer may be made of either a diamagnetic, or ferromagnetic, material.

The diameter of the magnetic balls may be larger than the diameter of the contact aperture.

The letters N and S in the figures shows relative positions of the north and south magnetic poles of the magnetic balls, respectively.

Operation of a connector according to various embodiments will be described in terms of an electrical connection that includes two electrical connectors.

Stage 1. An electrical signal or electrical voltage is coupled to one of the electrical connectors.

Stage 2. As the second electrical connector approaches the first one and approaches an interaction zone, each magnetic ball of each connector is affected by the magnetic fields of the ball of the counterpart connector. As a result the balls rotate so that the opposing magnetic poles face each other, and are attracted magnetically.

The retainer is in the form of a spring and situated in each electrical connector. The spring may include a ring or collar to ensure reliable contact of the retainer (being an extension of the electrical contact) and the magnetic ball along the entire circumference of the contact.

Essentially, interaction with a peer magnetic contact results in reorientation of the magnetic balls and further mutual attraction up to physical (ohmic) contact, which forms the electrical connection of the entire circuit.

At the moment of engagement, the springs of the interacting contacts are strained. This ensures, simultaneously, a closed state of the contacts, and their relative alignment in the contact plane until the coincidence of the perpendiculars passing through the centers of the magnetic balls.

Stage 3. When the electrical contacts are taken apart by a force exceeding the magnetic adhesion, the circuit opens, and at the same instant the retainers start pressing the magnetic balls away from the connector surface, thus retracting them into their respective cavities and preventing their protrusion beyond the surface of the body of the connector.

Various advantages may be realized by embodiments of the invention as described herein. The connectors they do not differ in gender (male/female) and can be used in any combination. Since the diameter of the ring portion of the spring portion of the retainer is shorter than the diameter of the magnetic ball, the ball contacts this section along its circumference, rather that at one point, which ensures good electrical contact and no chatter. The spring presses the magnetic ball inwards and holds it in this position within the cavity in the connector body, when there is no contact pair and the balls are not attracted to any object magnetically. As a result, the ball does not hang loose in its cavity when it is idle in its non-engaged state. Further, the spring of the retainer presses the magnetic balls into the connector body to retract it in the absence of a peer connector, thus, no extra wear surfaces are formed if the body has a face.

Also, advantageously, when the magnetic ball rotates under a magnetic field in the presence of a peer connector, the magnetic ball rubs against the interior edge of the ring portion, thus removing oxide film and promoting reliable electrical connection.

Since the diameter of the magnetic ball is somewhat longer than the diameter of the contact aperture, there is a certain gap which allows the magnetic ball to protrude slightly beyond the surface of the connector body in an engaged state (under magnetic interaction with a mating electric connector), thus resolving the issue of unstable gaps between different electrical connectors.

Such electrical connectors are suitable for installation in structures that have planes designed for slide or shear operation, i.e., one surface can move relative to the other, but the electrical connection will be retained. This is an important property that conventional connectors usually lack.

Moreover, using such connectors produces a satisfying tactile sensation for the user. Additionally, a pleasant click sound may be heard upon engagement of the magnets, which is a desirable user experience. Moreover, the sound is an audible indication of the electrical connection.

ADDITIONAL NOTES AND EXAMPLES

Example 1 is an electrical connector, comprising: a connector body, including a cavity and defining a contact aperture that provides an opening to the cavity through a connector surface; an electrical contact situated in the cavity, the electrical contact comprising: a ball comprising magnetic material; and a retainer that includes, a planar spiral spring portion and a ring portion, wherein: the retainer comprises an electrically-conductive material; the ring portion has a ring diameter that is smaller than a diameter of the magnetic ball and is arranged to circumferentially contact the magnetic ball; the planar spiral spring portion is arranged to cause the ring portion to press the magnetic ball into the cavity and away from the contact aperture in an absence of magnetic interaction between the magnetic ball and a second magnetic ball of a peer electrical contact; and during interaction between the magnetic ball and the second magnetic ball, the planar spiral spring portion is strained and the magnetic ball protrudes partially from the connector body while maintaining electrical contact with the second magnetic ball.

In Example 2, the subject matter of Example 1 includes, wherein the retainer comprises a diamagnetic material.

In Example 3, the subject matter of Example 1 includes, wherein the retainer comprises a ferromagnetic material.

In Example 4, the subject matter of Examples 1-3 includes, wherein in the presence of the interaction between the magnetic ball and the second magnetic ball, the magnetic ball rotates into magnetic alignment with the second magnetic ball.

In Example 5, the subject matter of Example 4 includes, wherein when the magnetic ball rotates into the magnetic alignment, the magnetic ball rubs against the ring portion.

Example 6 is an electrical connection including two electrical connectors, each of which includes, a connector body with a contact aperture, each connector body defining a cavity in which an electrical contact is situated, the electrical contact comprising a magnetic ball and a retainer comprising a current-conducting material; wherein the retainer in each electrical connector is made as a spring shaped as a planar spiral and having a ring portion; wherein the ring portion has an internal diameter that is smaller than a diameter of the magnetic ball; wherein the retainer is arranged to bias the magnetic ball inward into the cavity and away from the contact aperture in an absence of interaction between the magnetic balls of the two electrical connectors; and wherein in a presence of an interaction between the magnetic balls of the two electrical connectors, each spring portion is strained and the respective magnetic ball of each of the two connectors protrudes from its corresponding connector body while remaining in electrical contact with the other magnetic ball of the other electrical connector.

In Example 7, the subject matter of Example 6 includes, wherein each retainer comprises a diamagnetic material.

In Example 8, the subject matter of Example 6 includes, wherein each retainer comprises a ferromagnetic material.

In Example 9, the subject matter of Examples 6-8 includes, wherein each ring portion is arranged to circumferentially contact its respective magnetic ball.

In Example 10, the subject matter of Examples 6-9 includes, wherein in the presence of the interaction between the magnetic balls of the two electrical connectors, the magnetic balls rotate into magnetic alignment.

In Example 11, the subject matter of Example 10 includes, wherein when the magnetic balls rotate into magnetic alignment, each of the magnetic balls rubs against its respective ring portion.

CONCLUSION

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112(f) of 35 U.S.C. are not to be invoked unless the specific terms "means for" or "step for" are recited in a claim.

What is claimed:

1. An electrical connector, comprising:
- a connector body, including a cavity and defining a contact aperture that provides an opening to the cavity through a connector surface;
- an electrical contact situated in the cavity, the electrical contact comprising:
  - a ball comprising magnetic material; and
  - a retainer that includes a planar spiral spring portion and a ring portion, wherein:
    - the retainer comprises an electrically-conductive material;
    - the ring portion has a ring diameter that is smaller than a diameter of the magnetic ball and is arranged to circumferentially contact the magnetic ball;
    - the planar spiral spring portion is arranged to cause the ring portion to press the magnetic ball into the cavity and away from the contact aperture in an absence of magnetic interaction between the magnetic ball and a second magnetic ball of a peer electrical contact; and
    - during interaction between the magnetic ball and the second magnetic ball, the planar spiral spring portion is strained and the magnetic ball protrudes partially from the connector body while maintaining electrical contact with the second magnetic ball.

2. The electrical connector of claim 1, wherein the retainer comprises a diamagnetic material.

3. The electrical connector of claim 1, wherein the retainer comprises a ferromagnetic material.

4. The electrical connector of claim 1, wherein in the presence of the interaction between the magnetic ball and the second magnetic ball, the magnetic ball rotates into magnetic alignment with the second magnetic ball.

5. The electrical connector of claim 4, wherein when the magnetic ball rotates into the magnetic alignment, the magnetic ball rubs against the ring portion.

6. An electrical connection including two electrical connectors, each of which includes a connector body with a contact aperture, each connector body defining a cavity in which an electrical contact is situated, the electrical contact comprising a magnetic ball and a retainer comprising a current-conducting material;

wherein the retainer in each electrical connector is made as a spring shaped planar spiral and having a ring portion;

wherein the ring portion has an internal diameter that is smaller than a diameter of the magnetic ball;

wherein the retainer is arranged to bias the magnetic ball inward into the cavity and away from the contact aperture in an absence of interaction between the magnetic balls of the two electrical connectors; and wherein in a presence of an interaction between the magnetic balls of the two electrical connectors, each spring portion is strained and the respective magnetic ball of each of the two connectors protrudes from its corresponding connector body while remaining in electrical contact with the other magnetic ball of the other electrical connector.

7. The electrical connection of claim 6, wherein each retainer comprises a diamagnetic material.

8. The electrical connection of claim 6, wherein each retainer comprises a ferromagnetic material.

9. The electrical connection of claim 6, wherein each ring portion is arranged to circumferentially contact its respective magnetic ball.

10. The electrical connection of claim 6, wherein in the presence of the interaction between the magnetic balls of the two electrical connectors, the magnetic balls rotate into magnetic alignment.

11. The electrical connection of claim 10, wherein when the magnetic balls rotate into magnetic alignment, each of the magnetic balls rubs against its respective ring portion.

* * * * *